May 17, 1932. J. T. McENIRY 1,858,408
FREIGHT CAR
Filed April 23, 1930
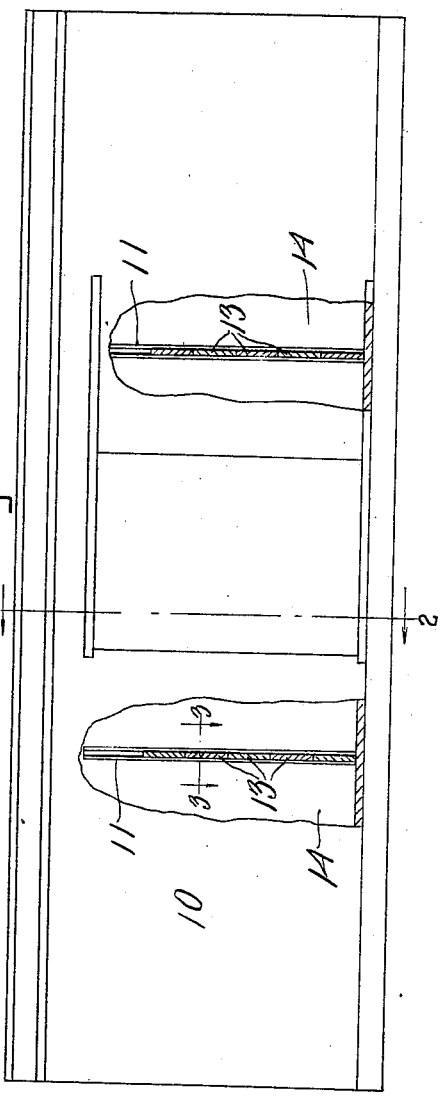
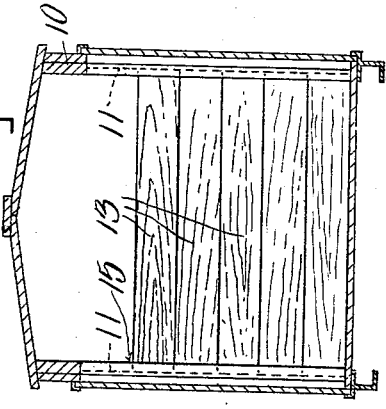
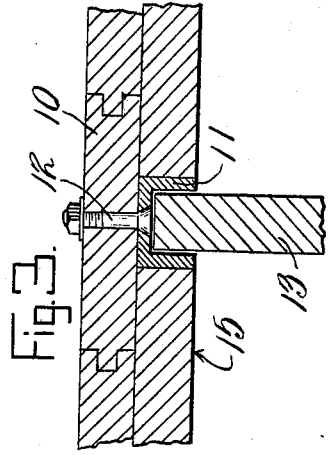
Inventor
John T. McEniry
By
Attorney Patented May 17, 1932

1,858,408

UNITED STATES PATENT OFFICE

JOHN T. McENIRY, OF BESSEMER, ALABAMA

FREIGHT CAR

Application filed April 23, 1930. Serial No. 446,769.

This invention relates to improvements in the construction of freight cars, with particular attention to the structure by means of which damage to freight in transit may be lessened.

A further object of the invention is to provide means whereby injury to the car may be lessened, due to the shifting of freight in transit when less than carload lots are hauled.

Further objects and advantages will become apparent as the description proceeds.

Referring to the accompanying drawings, which are made a part hereof and on which similar reference characters indicate similar parts.

Figure 1 is a side elevation of the car with parts shown in vertical section,

Figure 2 is a section on line 2—2 of Fig. 1, and

Figure 3 is a section on line 3—3 of Fig. 1.

In the drawings, reference character 10 indicates the side of a car, to which the device is attached. 11 indicates channel irons placed in an upright position and secured to the sides of the car by means of countersunk bolts 12. The channel irons 11 when secured to the side of the car provide means for holding a number of partition boards 13 by means of which the car may be divided into a number of separate compartments 14, these compartments preventing shifting of the load in the car. Even when the car is loaded to capacity, the load will never fill the car up to the ceiling. Sudden jerks in starting and sudden stopping will tend to cause the load to slide to one end of the car, such sliding causing serious damage due to breakage of the packages or of the material. By means of the partitions, the load will be held relatively stationary, and hence uninjured. When shipping less than carload lots, the material may be loaded in only one compartment, in which case it will be held relatively stationary, and thus uninjured.

It will be obvious to those skilled in the art that various changes may be made in my device without departing from the spirit of the invention, and I, therefore, do not limit myself to what is shown in the drawings and described in the specification, but only as set forth in the appended claim.

Having thus fully described my said invention, what I claim as new and desire to secure by Letters Patent, is:

The combination with a freight car or the like of a pair of channel irons vertically secured to and embedded in the sides of said car with their edges flush with the inside surface of the walls of the car and a plurality of partition boards loosely placed in vertical position one above the other in said channel irons and of a length greater than the distance between the inside surfaces of said walls of the car, substantially as set forth.

In witness whereof, I have hereunto set my hand at Bessemer, Alabama, this 21st day of April, A. D. nineteen hundred and thirty.

JOHN T. McENIRY.